UNITED STATES PATENT OFFICE.

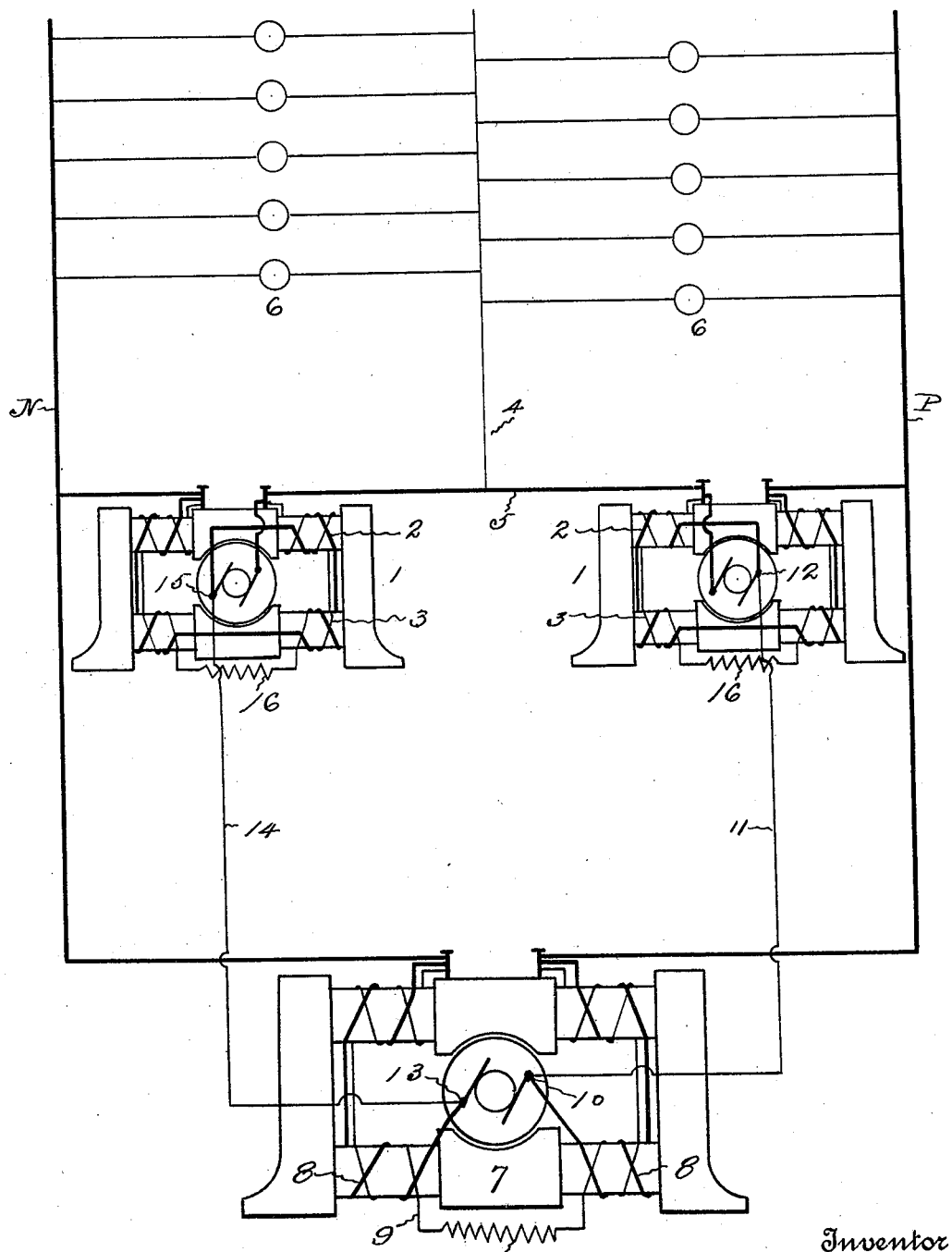

HARRY E. HEATH, OF WINDSOR, CONNECTICUT, ASSIGNOR TO THE EDDY ELECTRIC MANUFACTURING COMPANY, OF SAME PLACE.

SYSTEM OF ELECTRICAL DISTRIBUTION.

SPECIFICATION forming part of Letters Patent No. 678,998, dated July 23, 1901.

Application filed May 15, 1901. Serial No. 60,253. (No model.)

*To all whom it may concern:*

Be it known that I, HARRY E. HEATH, a citizen of the United States, residing at Windsor, in the county of Hartford and State of Connecticut, have invented certain new and useful Improvements in Systems of Electrical Distribution, of which the following is a specification.

This invention relates to those systems of electrical distribution which have translating devices connected between the main wires in multiple series and have a neutral wire connected between the generators and dividing each series of translating devices, so as to conduct the current used by one series that is in excess of the current used by the other series.

The object of the invention is to so connect the generators with the main and neutral wires that the efficiency of such a system of electrical distribution may be increased and the regulation automatically accomplished with the addition of a minimum number of generators.

For the purposes of illustrating this invention the accompanying drawing was made to show a diagrammatic view of a three-wire system of electrical distribution having one neutral and two main wires, with the translating devices connected in multiple series between the main wires and in multiple between the neutral and main wires with two compound-wound dynamo-generators, one each side of the neutral wire, connected in series between the main wires and forming the primary sources of electrical energy and one compound-wound dynamo-generator forming the secondary source of electrical energy directly connected with the main wires and connected by means of equalizing-wires with the primary generators between the series coils and the armatures of those generators, whereby all of the generators will automatically take their proportion of the load, and the primary generators will furnish the current used by one series of translating devices that is in excess of the current used by the other series.

In the system illustrated the primary generators 1, having the series coils 2 and the shunt-coils 3, are connected in series between the main wires P and N. The neutral wire 4 is connected with the wire 5, that connects the primary generators. There may be any desired number of generators connected between the main wires each side of the neutral wire. The translating devices 6, which may be incandescent or arc lamps, motors, heaters, batteries, or electrolytic baths, are connected in multiple between the neutral wire and the main wires, so that they are in multiple series between the main wires. The secondary generator 7, with series coils 8 and shunt-coils 9, is directly connected with the main wires. One half of the series coils of the secondary generator are connected between one side of the armature and a main wire, and the other half of the series coils are connected between the other side of the armature and the other main wire. There may of course be more than one of these secondary generators. One armature-terminal 10 of the secondary generator is by an equalizing-wire 11 connected with the armature-terminal 12 between the armature and series coil of one primary generator, and the other armature-terminal 13 of the secondary generator is by an equalizing-wire 14 connected with the armature-terminal 15 between the series coil and armature of the other primary generator. The equalizer-wires join the inner ends of the series coils of the primary generator and the inner ends of the series coils of the secondary generators that are connected to the same main wire.

A rheostat 16 is connected with the shunt-coil of each primary generator and a rheostat 17 is connected with the shunt-coil of the secondary generator.

If the translating devices of each series are using the same amounts of current, the neutral wire has no current and the primary generators connected in series and the secondary generator operate as if connected in multiple. When the translating devices of one series are using more current than those of the other, the excess current is furnished by the primary generators, and the neutral wire is utilized in the ordinary way to conduct the excess in a direction according to the side in excess.

Any excess of current used by one series of translating devices tends to increase the voltage of the armature of the primary generator connected on the same side of the neutral wire as that series; but as the terminal of that armature is connected by an equalizer-wire with the terminal of the armature of the secondary generator inside of a series coil a portion of the excess current will flow through the equalizer to the series coil of the secondary generator and increase the voltage of the armature of the secondary generator until the potential between the mains across the secondary generator equals the potential between the mains across the primary generators. Without the equalizer-wires an increase of voltage of one of the primary armatures would raise the potential between the mains across the primary generators above the potential between the mains across the secondary generator and cause that generator to reverse and resist the supplying of current to the mains.

With this arrangement of generators and conductors a system of electrical distribution is provided which is simple to instal and maintain, which will automatically regulate itself to the variations of current used by the different series of translating devices, and the capacity of which can be increased, as desired, by connecting additional generators with the main wires without regard to their connection to the neutral wire, except through equalizing-wires, and without effecting the self-regulation of the system. By means of this system a single generator may be connected with an ordinary three-wire system for increasing its output when desired without disturbing the balance of the system.

I claim as my invention—

1. A system of electrical distribution having main wires, a neutral wire, compound-wound generators connected in series between the main wires with one-half each side of the neutral wire, a compound-wound generator connected between the main wires, and equalizing-wires connecting the armature-terminals of the latter generator with an armature-terminal of each of the former generators, substantially as specified.

2. A system of electrical distribution having main wires, a neutral wire, compound-wound generators connected in series between the main wires with one-half each side of the neutral wire, a compound-wound generator connected between the main wires, and equalizer-wires joining the inner ends of the series coils of the latter generator with the inner ends of the series coils of the former generators that are connected with the same main wire, substantially as specified.

3. A system of electrical distribution having main wires, a neutral wire, compound-wound generators connected in series between the main wires with one-half each side of the neutral wire, a compound-wound generator connected between the main wires, an equalizer-wire connecting one armature-terminal of the secondary generator with the armature-terminal between the armature and series coil of one of the primary generators, and an equalizer-wire connecting the other armature-terminal of the secondary generator with the armature-terminal between the series coil and the armature of the other primary generator, substantially as specified.

4. A system of electrical distribution having main wires, a neutral wire, translating devices connected in multiple between the neutral wire and the main wires, and in multiple series between the main wires, compound-wound generators connected in series between the main wires with one-half each side of the neutral wire, a compound-wound generator connected between the main wires, and equalizer-wires connecting the armature-terminals of the latter generator with an armature-terminal of each of the former generators, substantially as specified.

HARRY E. HEATH.

Witnesses:
WILLIAM R. C. CORSON,
EDWARD E. ROBERTS.